United States Patent [19]
Kanda

[11] Patent Number: 6,137,943
[45] Date of Patent: Oct. 24, 2000

[54] SIMULTANEOUS VIDEO RECORDING AND REPRODUCING SYSTEM WITH BACKUP FEATURE

[75] Inventor: Takeshi Kanda, Tokyo, Japan

[73] Assignee: Sony Corporation, Tokyo, Japan

[21] Appl. No.: 08/927,695

[22] Filed: Sep. 11, 1997

[30] Foreign Application Priority Data

Sep. 11, 1996 [JP] Japan .................................. 8-240791

[51] Int. Cl.⁷ ........................................................ H04N 5/91
[52] U.S. Cl. ............................. 386/46; 386/35; 386/125; 348/705; 360/62
[58] Field of Search ............................... 386/45, 46, 52, 386/109, 112, 35, 125–126; 360/7, 8, 62; 369/60, 47; 348/552, 705, 722; H04N 5/91

[56] References Cited

U.S. PATENT DOCUMENTS

| | | | |
|---|---|---|---|
| 5,134,499 | 7/1992 | Sata et al. | 386/126 |
| 5,164,839 | 11/1992 | Lang | 360/8 |
| 5,241,428 | 8/1993 | Goldwasser et al. | 360/7 |
| 5,257,142 | 10/1993 | Hong | 386/46 |
| 5,345,430 | 9/1994 | Moe | 360/7 |
| 5,371,551 | 12/1994 | Logan et al. | 386/112 |
| 5,436,875 | 7/1995 | Shinada | 369/47 |
| 5,438,423 | 8/1995 | Lynch et al. | 386/109 |
| 5,526,132 | 6/1996 | Tsubota et al. | 386/52 |
| 5,563,714 | 10/1996 | Inoue et al. | 386/125 |
| 6,018,612 | 1/2000 | Thomason et al. | 386/125 |

FOREIGN PATENT DOCUMENTS

0544299 A2  6/1993  European Pat. Off. ........ G11B 20/10

*Primary Examiner*—Wendy Garber
*Assistant Examiner*—Vincent F. Boccio
*Attorney, Agent, or Firm*—Frommer Lawrence & Haug, LLP.; William S. Frommer; Bruno Polito

[57] ABSTRACT

In a recording support mode, states of an HD device and a VTR are detected, and if the two are normal, video signals are recorded in both. The signal recorded in the HD device can be reproduced almost simultaneously with the recording upon request. Where either device is abnormal, the video signal is recorded in the normal device. In the reproduction support mode, the reproduction position of the HD device is detected, the VTR video tape is brought to that position, it is checked whether or not the video signal the same as the video signal which has been reproduced by the HD device is recorded based on the time code of the video signal recorded at that position, and the reproduction of the same video signal is carried out simultaneously with the HD device. Thereafter, where an abnormality occurs in the HD device, a third switch is changed over so that the video signal reproduced at the VTR is output.

12 Claims, 9 Drawing Sheets

SIMULTANEOUS VIDEO RECORDING AND REPRODUCING SYSTEM WITH BACKUP FEATURE

BACKGROUND OF THE INVENTION

Field of the Invention

The present invention relates to a video signal recording and reproducing apparatus which is capable of recording video signals and reproducing them simultaneously with the recording, more particularly relates to a video signal recording and reproducing apparatus having a better reliability.

The advances made in image processing technology and recording technology have made it become possible to record video signals on a recording medium such as hard disc. By recording video signals on such a randomly accessible recording medium, the processing of editing etc. can be easily carried out. As such an apparatus for recording video signals on a randomly accessible recording medium and effectively utilizing them, there also exists an apparatus capable of performing reproduction at almost the same time as that for recording.

An example of an apparatus capable of performing simultaneous recording and reproduction will be explained by referring to FIGS. 1A and 1B.

FIG. 1A is a view of an example of the configuration of an apparatus capable of performing simultaneous recording and reproduction; while FIG. 1B is a view of the operation of that apparatus.

As shown in FIG. 1A, a video signal recording and reproducing apparatus 900 is constituted by a simultaneous recording and reproduction device 910 for recording and reproducing video signals and a control use computer 920 for controlling the simultaneous recording and reproduction device 910.

The simultaneous recording and reproduction device 910 is a recording device using a hard disc as the recording medium. The hard disc device is provided with a recording head and a reproduction head operating independently from each other. By this, the recording and reproduction can be carried out in parallel. Accordingly, as shown in FIG. 1B, even a just recorded video signal can be immediately reproduced and output delayed by exactly a time ΔT, that is, the time of rotation of the disc from the position of the recording head to the position of the reproduction head.

Of course, since the recording medium is a hard disc, so the video signals can be reproduced at random.

However, a hard disc device has a problem in that the reliability is very low in comparison with a VTR apparatus which has been the main recording medium for recording video signals heretofore.

In a hard disc device, crashes etc. are caused even by a slight shock. The probability of occurrence of damage is very high in comparison with a tape recorder device. If such damage once occurs, there arises a problem in that it becomes impossible to record video signals and reproduce recorded signals. Particularly, in broadcasting stations, where effective use is made of such apparatuses capable of performing simultaneous recording and reproduction, there are many cases where such apparatuses are transported to the news site for use, so the probability of occurrence of damage is even higher.

As a countermeasure in order to deal with such damage, it has been considered to process recorded video signals separately by a VTR apparatus. However, if two apparatuses have to be operated for one video signal, the operatability is poor. In addition, this complicates and enlarges the size of the system. This is therefore not a suitable countermeasure.

Further, in the above simultaneous recording and reproducing apparatus, in the case of performing a nonlinear editing of video signals recorded in other apparatuses, the video signals must be transferred to that apparatus, so there also exists a problem in that the operation was troublesome and a long time was taken. Namely, there have been demands for easier utilization of the recorded video signals.

SUMMARY OF THE INVENTION

An object of the present invention is to provide a video signal recording and reproducing apparatus capable of reproducing and outputting input video signals at a desired timing including a case of almost simultaneous reproduction with the recording, having a higher reliability, better operability, and higher applicability and convenience.

To achieve the object of the present invention, the present invention provides a video signal recording and reproducing apparatus provided with both a hard disc device able to be random accessed and capable of simultaneously performing recording and reproduction and a VTR having a higher reliability and with a host controller for managing and controlling the same together. Further, these devices can be dynamically selected for use as a device for recording the video signals which are input and a device for reproducing a requested video signal. The control with respect to these two devices can be visually and easily carried out under a GUI environment.

Accordingly, the present invention provides a video signal recording and reproducing apparatus having a first recording and reproducing means for recording input video signals and reproducing the recorded video signals at any time including a substantially simultaneous time with the recording upon request after that time; a second recording and reproducing means for recording the video signals to be recorded in the first recording and reproducing means simultaneously with the first recording and reproducing means upon request; a selecting means for selecting a video signal reproduced in either of the first recording and reproducing means or the second recording and reproducing means; and a controlling means for controlling the recording of the input video signals to the second recording and reproducing means and the selection of the video signals in the selecting means.

Preferably, the controlling means performs the control so that the second recording and reproducing means records the input video signals when the recording state of the video signals in at least the first recording and reproducing means is not adequate. Also, the control is performed so that the selecting means selects the video signal to be reproduced by the second recording and reproducing means when the reproduction state of the video signals in at least the first recording and reproducing means is not adequate.

Further, preferably, the video signal recording and reproducing apparatus of the present invention further has a time code generating means for generating a predetermined time code with respect to at least an input video signal, and the first recording and reproducing means and the second recording and reproducing means synchronously reproduce video signals based on the time code. This time code can be one based on the time code input from an external unit together with the video signal or a time code generated in a time code generating means.

Further preferably, the controlling means has a first controlling means for directly controlling at least the first recording and reproducing means, the second recording and reproducing means, and the selecting means and operating the means in synchronization and a second controlling means for receiving as its inputs instructions of workers instructing predetermined control procedures with respect to the first controlling means based on the input instructions. Preferably, the second controlling means is constituted by a general purpose computer etc. capable of performing an operation on a display based on a graphical user interface (GUI) and at least the recording of the input video signals to the second recording and reproducing means. Instructions of workers concerning the selection of the video signals in the selecting means are carried out by this.

Also, specifically, the first recording and reproducing means is a means for recording the video signals on a randomly accessible disc-like recording medium; and the second recording and reproducing means is a means for recording the video signals on a tape-like recording medium.

Also preferably, the video signal recording and reproducing apparatus of the present invention further has a coding means for coding the video signals by a predetermined coding system and a decoding means for decoding coded video signals; and the first recording and reproducing means and second recording and reproducing means record the coded video signals and, at the time of output, decode the reproduced and coded video signals and output the same.

Further preferably, the video signal recording and reproducing apparatus of the present invention further has a transferring means for transferring the coded video signals recorded in the second recording and reproducing means directly to the first recording and reproducing means.

BRIEF DESCRIPTION OF THE DRAWINGS

These and other objects and features of the present invention will become clearer from the following description of the preferred embodiments with reference to the accompanying drawings, in which.

DESCRIPTION OF THE PREFERRED EMBODIMENTS

A firs embodiment of the video signal recording and reproducing apparatus of the present invention will be explained with reference to FIG. 2 to FIG. 7.

The video signal recording and reproducing apparatus of the present embodiment is a video signal recording and reproducing apparatus having a hard disc device capable of almost simultaneously performing the recording of an input video signals and the reproduction of same and a video tape recorder device for backup of the recording and reproduction to that hard disc. This video signal recording and reproducing apparatus is an apparatus enabling confirmation of a decisive moment of the video and instantaneous reproduction in parallel to the recording while continuously performing the recording of the video signals in programs in which the possibility of occurrence of sudden matters and decisive matters is high such as sports broadcasts and news programs in for example a television broadcasting station.

Figure 1A:
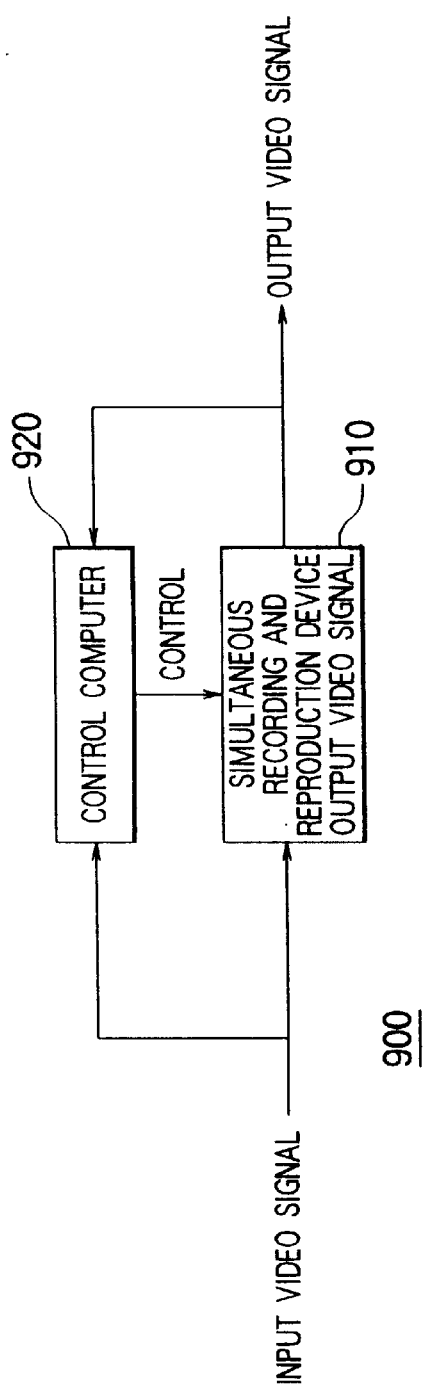
FIG. 1A is a view of an example of the configuration of a video signal recording and reproducing apparatus.
Figure 1B:
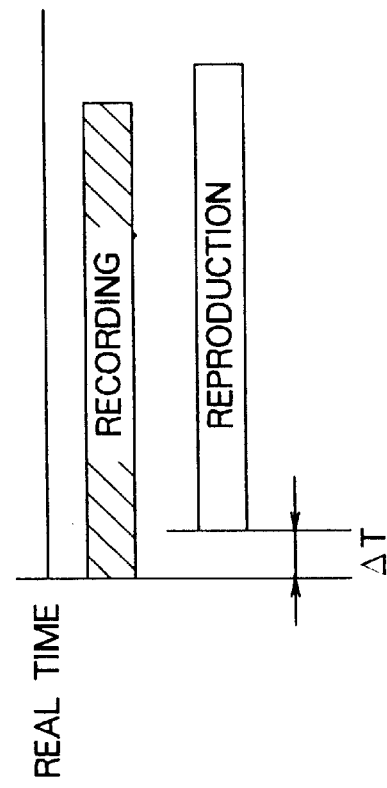
FIG. 1B is a view of the operation of the video signal recording and reproducing apparatus.
Figure 2:
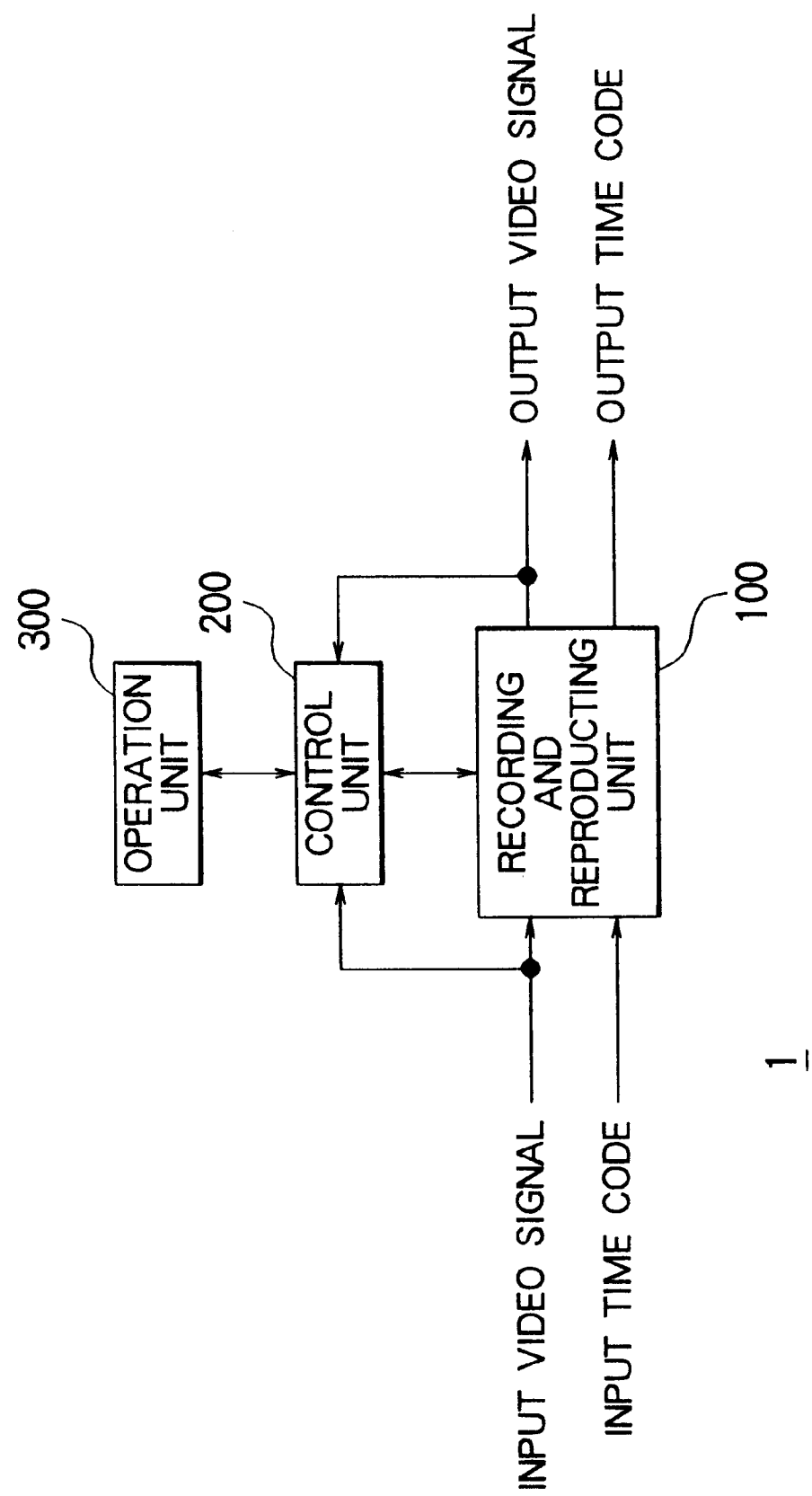
FIG. 2 is a schematic block diagram of the configuration of the video signal recording and reproducing apparatus according to an embodiment of the present invention.

FIG. 2 is a block diagram of the configuration of a video signal recording and reproducing apparatus 1.

The video signal recording and reproducing apparatus 1 has a recording and reproducing unit 100, a control unit 200, and an operation unit 300.

First, an explanation will be made of the configuration of the units.

The recording and reproducing unit 100 actually records the input video signals based on a control signal from the control unit 200 and reproduces and outputs the same upon request.

Figure 3:
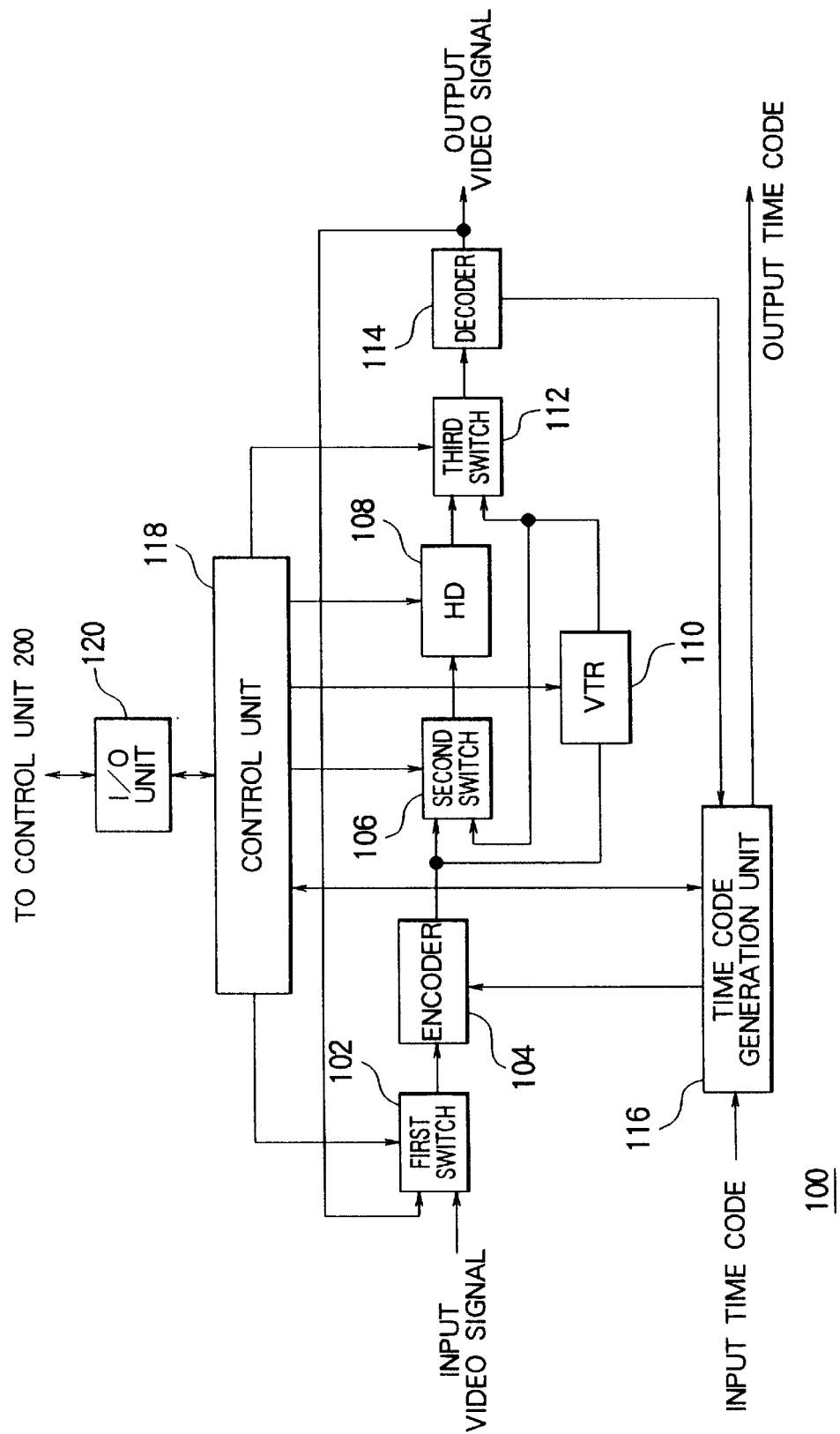
FIG. 3 is a block diagram of the configuration of a recording and reproducing unit of the video signal recording and reproducing apparatus shown in FIG. 2.

A more detailed configuration of the recording and reproducing unit 100 is shown in FIG. 3.

FIG. 3 is a block diagram of the configuration of the recording and reproducing unit 100. The recording and reproducing unit 100 has a first switch 102, an encoder 104, a second switch 106, a hard disc (HD) device 108, a video tape recorder (VTR) device 110, a third switch 112, a decoder 114, a time code generation unit 116, a control unit 118, and an IO unit 120.

the first switch 102 selects the video signal to be input and recorded with respect to the HD device 108 and the VTR 110 based on a control signal from the control unit 118. In the first switch 102, either of the video signal input from an external unit or the video signal output from the decoder 114 is selected. Usually, the former is selected in the case where the input video signal is to be recorded, and the latter is selected in the case where the video signal recorded in the HD device 108 is transferred to the VTR 110. The selected video signal is output to an encoder 104.

The encoder 104 encodes the video signal input from the first switch 102 by the MPEG system (high quality moving picture coding system by Moving Picture Coding Experts Group) and outputs the encoded video signal to the second switch 106 and the VTR 110. At this time, to the encoder 104 receives as input the data of the time code from the time code generation unit 116. This is multiplexed on the video signal to generate the encoded video signal.

the second switch 106 selects the encoded video signal to be input to the HD device 108 based on a control signal from the control unit 118. In the second switch 106, either of the encoded video signal which is reproduced and output at the VTR 110 or the encoded video signal which is selected at the first switch 102 and output from the encoder 104 is selected. Usually, the former is selected in the case where the input video signal is to be recorded, and the latter is selected in the case where the video signal recorded in the VTR 110 is transferred to the HD device 108. The selected encoded video signal is output to the HD device 108.

The HD device 108 records the encoded video signal input via the second switch 106 based on a control signal from the control unit 118 and reproduces and outputs the recorded encoded video signal in parallel to the recording. The HD device 108 is a large capacity recording device using a hard magnetic disc as the recording medium and can simultaneously perform the recording and reproduction by a plurality of heads.

The VTR 110 is a device which records the encoded video signal input from the encoder 104 on a video cassette tape and reproduces and outputs the encoded video signal already recorded on the video cassette tape and is used as a backup device for the recording or reproducing of the video signal in the HD device 108. Concretely, in the case of backup of the recording of the video signal, the video signals input via the first switch 102 and the encoder 104 is recorded on also the VTR 110 simultaneously with the HD device 108. Further, in the case of the backup of the reproduction of the video signal, the video cassette tape on which the video signals have been already recorded is reproduced at the same time as that of the reproduction of the video signals in the HD device 108. The operations of the VTR 110 are all carried out based on a control signal from the control unit 118. Further, the video signals reproduced at the VTR 110 are output to the third switch 112.

The third switch 112 selects the video signal output from the video signal recording and reproducing apparatus 1. In the third switch 112, as the output video signal, either of the video signal reproduced at the HD device 108 or the video signal reproduced at the VTR 110 is selected. This selection operation is carried out based on a control signal from the control unit 118, but for example, usually, the output of the HD device 108 is mainly selected. The output of the VTR 110 is selected where the HD device 108 is malfunctioning etc.

The decoder 114 decodes the video signal which is reproduced at the HD device 108 or the VTR 110 and output via the third switch 112, generates an original baseband video signal, and outputs the same as the output signal from the video signal recording and reproducing apparatus 1. Note that a video signal encoded by the encoder 104 based on the MPEG system is recorded in the HD device 108 and the VTR 110, therefore MPEG decoding is carried out in the decoder 114. Further, the decoder 114 extracts the data of the time code multiplexed on the encoded video signal at the time of this decoding and outputs the same to the time code generation unit 116.

The time code generation unit 116 manages the data of the time code to be added to the video signal at the time of recording and reproduction of the video signal. More specifically, at the input of the video signal, a time code is generated with respect to the video signal to be recorded and output to the encoder 104. At this time, when the data of the time code is input from an external unit together with the input of the video signal, the data of this time code is output as it is to the encoder 104. When the data of the time code is not input from an external unit, the time code is generated in the time code generation unit 116 and the generated time code is output to the encoder 104. Further, at the time of reproduction of the video signal, the time code separated from the video signal reproduced at the decoder 114 is input to the time code generation unit 116 and output to an external unit. Note that, the time code at the time of recording and reproduction is suitably output to the control unit 118.

The control unit 118 controls the parts of the recording and reproducing unit 100 based on the processing commands from the higher control unit 200 input via the IO unit 120 mentioned later. More specifically, when the recording command and reproduction command of the HD device 108 and the VTR 110 are input, these devices are controlled to carry out the desired recording and reproduction. Further, when the commands of simultaneous recording and simultaneous reproduction are input, both of the HD device 108 and the VTR 110 are controlled based on a single command for simultaneous recording of the input video signals to the HD device 108 and the VTR 110 and simultaneous reproduction at the HD device 108 and the VTR 110. Further, when a command for sensing the state of the HD device 108 is input to the control unit 118, the control unit 118 detects the operating state of the HD device 108, decides whether or not there is an abnormality, and outputs the result to the control unit 200. Also, in the case where a command to sense the state of the VTR 110 is input, similarly the operation state of the VTR 110 is detected and the result is output to the control unit 200. Other than this, the command for selection of the signals to be recorded on the HD device 108 and the VTR 110, the command for selection of the video to be output, etc. are input to the control unit 118. The control unit 118 appropriately switches the first switch 102, second switch 106, and third switch 112 in accordance with the commands.

The IO unit 120 is an interface for transmitting a control signal from the control unit 200 with respect to the recording and reproducing unit 100 and a response signal from the recording and reproducing unit 100 to the control unit 200. These signals are transmitted by a serial interface in the video signal recording and reproducing apparatus 1.

The control unit 200 controls the recording and reproducing unit 100 based on the operation of the recording and reproduction and editing operation of the worker appropriately carried out in the operation unit 300. From the operation unit 300, instructions, for example, the recording of the input video signals, reproduction of the recorded video signals, replay, slow reproduction, recording support, and reproduction support are input. In the control unit 200, based on these instructions, a group of commands controlling the components of an actual recording and reproducing unit 100 is generated. The recording and reproducing unit 100 is appropriately controlled by referring to also the state etc. input from the recording and reproducing unit 100.

Further, the control unit 200 receives as direct input the input video signal input to the recording and reproducing unit 100 and the output video signal output from the recording and reproducing unit 100. These video signals are converted to a format which can be displayed on the operation unit 300 mentioned later and then output to the operation unit 300.

Here, an explanation will be made of the processing of the recording support and reproduction support in the operation of such a control unit 200 according to the present invention by referring to flowcharts of FIG. 4 and FIG. 5.

First, an explanation will be made of the recording support processing.

Figure 4:
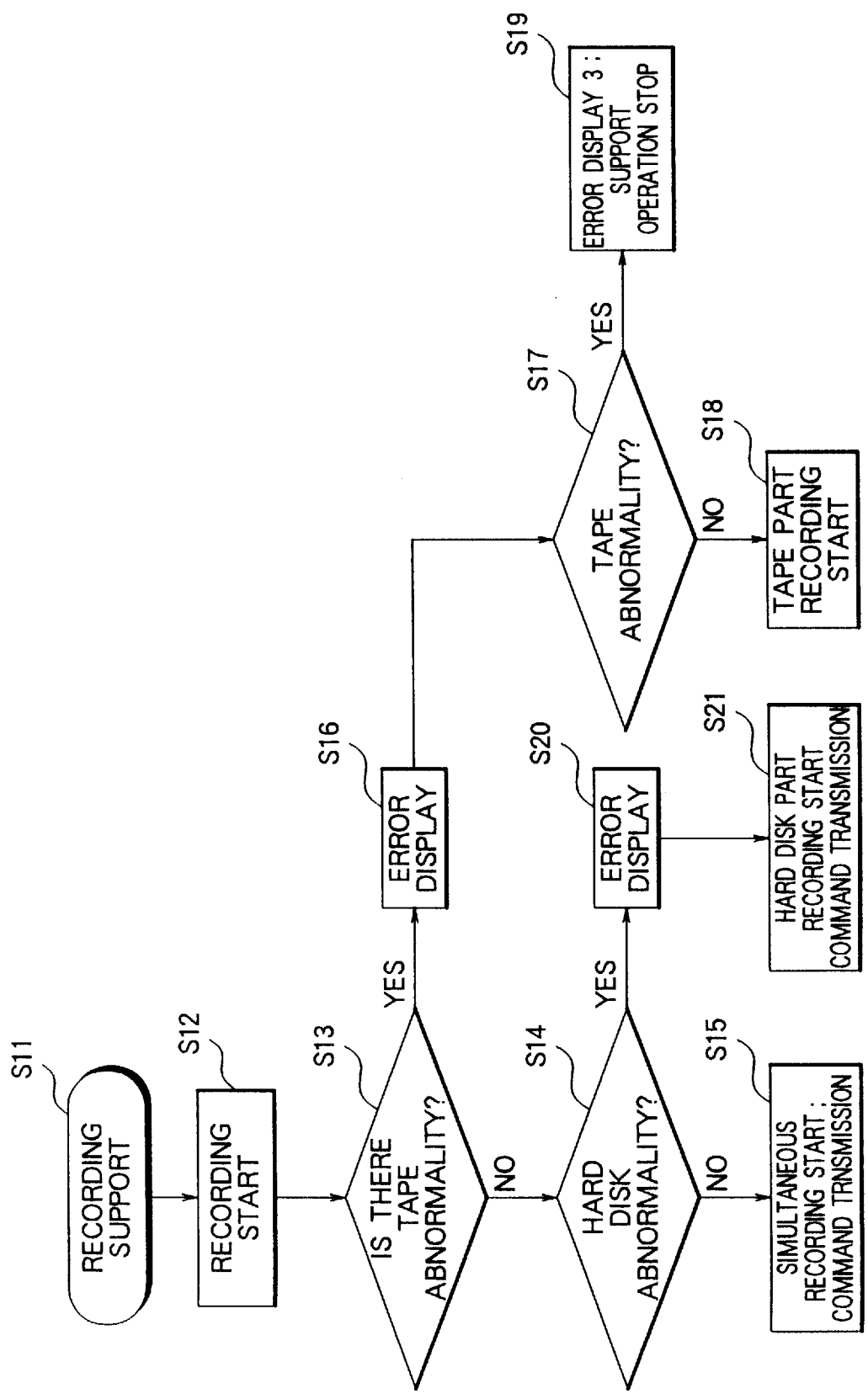
FIG. 4 is a flowchart of the processing at a recording support operation mode in the control unit of the video signal recording and reproducing apparatus shown in FIG. 2.

FIG. 4 is a flowchart of the recording support processing.

Figure 6:
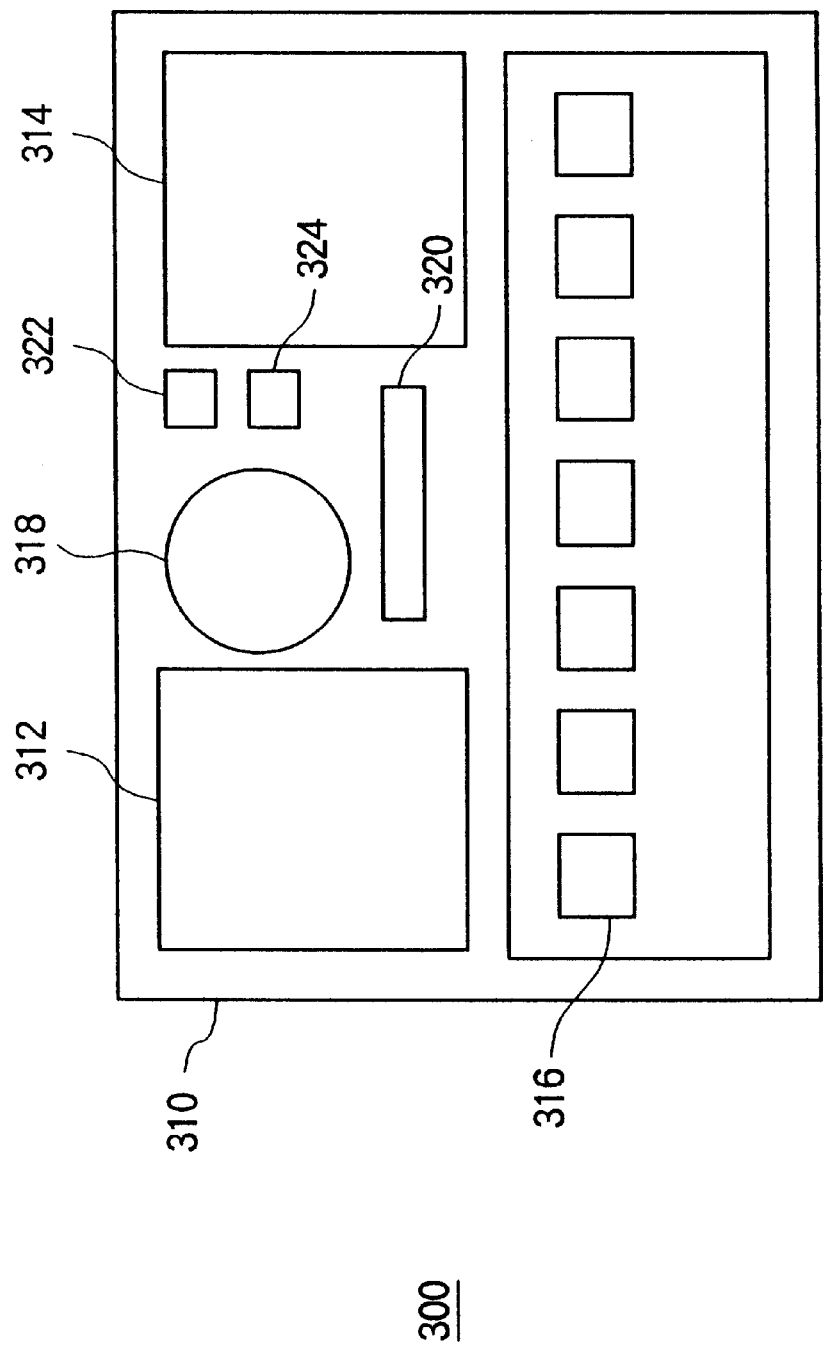
FIG. 6 is a view for explaining a GUI environment realized in a display device of an operation unit of the video signal recording and reproducing apparatus shown in FIG. 2.

In the present embodiment, execution of the recording support is instructed by a recording support instruction button 322 of the operation unit 300 shown in FIG. 6. When the recording support is instructed, execution of the recording support processing is started (step S11) and the actual start of recording is awaited (step S12). When the instruction of the recording start is similarly actually input via the operation unit 300, the detection of the state of the HD device 108 is first instructed to the recording and reproducing unit 100 (step S13). As a result, if there is no problem in the state of the HD device 108, the detection of the state of the VTR 110 is instructed next (step S14). If there is no problem either, a start command of the simultaneous recording at the HD device 108 and the VTR 110 is transmitted to the recording and reproducing unit 100 (step S15). By this, the input video signal is recorded in both of the HD device 108 and the VTR 110.

When an abnormality is found in the HD device 108 at step S13, an error display is performed for informing the abnormality of the HD device 108 to the operation unit 300 (step S16), then the detection of the state of the VTR 110 is instructed to the recording and reproducing unit 100 (step S17). When there is no abnormality in the VTR 110, the start command of recording is transmitted to the VTR 110 (step S18). By this, the input video signal is recorded in only the VTR 110.

At step S18, where the abnormality is found also in the VTR 110, an error display is performed for informing the abnormality of the VTR 110 to the operation unit 300, and the recording support operation and the recording operation are ended (step S19).

Further, where an abnormality is found in the VTR 110 at step S14, an error display is performed for informing the abnormality of the VTR 110 to the operation unit 300 (step S20), and the command for the start of the recording to the HD device 108 is transmitted to the recording and reproducing unit 100 (step S21). By this, the input video signal is recorded in only the HD device 108.

Next, an explanation will be made of the reproduction support processing. Note that, here, an explanation will be made of the case where the reproduction support processing is instructed and an already recorded video signal is reproduced by the reproduction support mode following the recording to the HD device 108 when simultaneous recording to the HD device 108 and the VTR 110 is carried out by the recording support processing.

Figure 5:
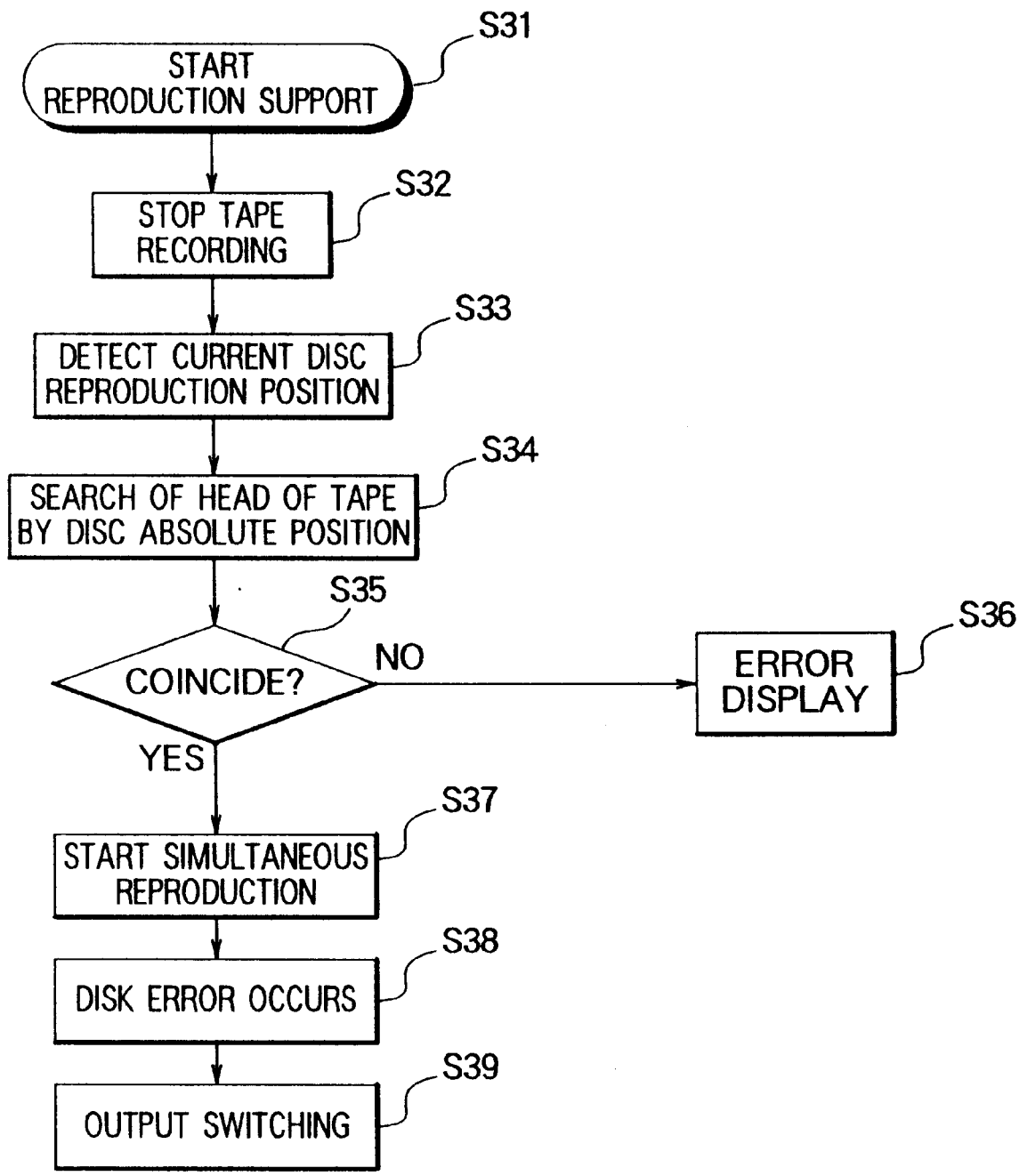
FIG. 5 is a flowchart of the processing at a reproduction support operation mode in the control unit of the video signal recording and reproducing apparatus shown in FIG. 2.

FIG. 5 is a flowchart showing the reproduction support processing.

For the reproduction support processing, the execution of the reproduction support is instructed by a click of the reproduction support instruction button 324 of the operation unit 300 mentioned later. When the reproduction support is instructed, the execution of the reproduction support processing is started (step S31) and the stopping of the recording of the video signal to the VTR 110 based on the recording support operation which is being carried out at present is instructed to the recording and reproducing unit 100 (step S32). By this, the recording support operation is forcibly ended.

Next, the detection of the position of the video signal which is reproduced and output at the HD device 108 at present is instructed to the recording and reproducing unit 100 (step S33), and the seek operation of the video signal recorded on the VTR 110 is instructed based on the information of the position thereof which is detected and input at the recording and reproducing unit 100 (step S34). Then, when the seek operation is ended, the time code of the video signal recorded at that position is further detected, and it is checked whether or not the video signal the same as the video signal reproduced at the HD device 108 is recorded (step S35). If the time codes do not coincide and it is determined that the same video signal has not been recorded, an error display is performed to the operation unit 300 and the reproduction support processing is ended (step S36).

Where the time codes coincide at step S35, synchronization is established based on the time code, the start of reproduction at the VTR 110 is instructed, and simultaneous reproduction with the HD device 108 is carried out (step S37).

Thereafter, monitoring of the state of the HD device 108 is instructed to the recording and reproducing unit 100 (step S38). Where an abnormality occurs in the HD device 108 (step S38), a command that the video signal reproduced at the VTR 110 be selected by the third switch 112 is output to the recording and reproducing unit 100 so that the video signal reproduced at the VTR 110 is output from the video signal recording and reproducing apparatus 1 (step S39).

The operation unit 300 is the operation unit for the recording, reproduction, editing, etc. of any video signal using the video signal recording and reproducing apparatus 1 and is constituted by a display unit for displaying the video data to be processed and the state of parts of the video signal recording and reproducing apparatus 1 etc. and an input unit for inputting the command. In the present embodiment, this operation unit 300 is usually constituted by a display and a mouse as used in a personal computer etc. and performs operations of the video signal recording and reproducing apparatus 1 under the GUI environment provided under the control of the control unit 200.

An example of the GUI screen is shown in FIG. 6.

FIG. 6 is a view of an operation screen of the operation unit 300. On the operation screen 310, an input video display 312, an output video display 314, an designated image display 316, a clock display 318, a time axis operation display 320, a recording support instruction button 322, and a reproduction support instruction button 324 are arranged.

The input video display 312 is a window for displaying the video signal to be input, while the output video display 314 is a window for displaying the video signal to be output.

The designated image display 316 is a window for displaying the video at a position selected by depressing a not illustrated video designation switch (mark switch). By performing this marking, a decisive moment of the video of for example a sports broadcast and the time of occurrence thereof can be visually and directly recorded and can be easily used for later replay, editing, etc.

The clock display 318 is for displaying various time information. For example, where the slow replay of the input and recorded video signal is carried out, it is possible to display the time of the reproduced screen. Further, where automatic recording of the transmitted video signal, automatic sending of the recorded video data, etc. are carried out, it is also possible to use the same for designating the time and for displaying the set time thereof. Further, it is also possible to use the same as an actual clock.

The time axis operation display 320 is a window for displaying the processing time of the video signal concerned, for example, the reproduction time of slow reproduction when performing the slow reproduction as mentioned above and various editing. By this, the operability of the editing, replay, etc. during reproduction of the program is improved.

The recording support instruction button 322 is a button for instructing whether or not to perform the support operation by the VTR apparatus for more reliably recording a video signal when performing the recording of the input video signal. By clicking this, the setting for making the support operation valid or invalid is appropriately switched. Where the recording support operation is made valid by this button, the control unit 200 carries out the above recording support processing.

The reproduction support instruction button 324 is a button for instructing whether or not to perform the support operation by the VTR apparatus for more reliably outputting the video signal when performing the reproduction and output of the recorded video signal. By clicking this, the setting for making the support operation valid or invalid is appropriately switched. Where the reproduction support operation is made valid by this button, the control unit 200 carries out the above reproduction support processing.

Next, an explanation will be made of the operation of the video signal recording and reproducing apparatus 1.

When the support operation of the recording and reproduction is not carried out, the video signal to be input to the video signal recording and reproducing apparatus 1 is input to the recording and reproducing unit 100. Then, in the recording and reproducing unit 100, it is input to the encoder 104 via the first switch 102, subjected to MPEG coding, and recorded in the HD device 108 via the second switch 106. The video signal recorded in the HD device 108 is delayed by exactly the slight time difference for rotation of the disc-like recording medium from the position of the recording head to the position of the reproduction head and can be immediately reproduced and can be reproduced from any position at the time in accordance with the request, input to the decoder 114 via the third unit 112, decoded at the decoder 114, and output.

At this time, the video signal recorded in the HD device 108 is reproduced and output in any state based on the operation from the operation unit 300. For example, the signal of an important scene is repeatedly reproduced or slowly reproduced.

Then, when recording an important video signal which one wishes to avoid missing as much as possible, the video signal is recorded in the recording support mode.

When the recording support instruction button 322 of the operation unit 300 is clicked, the recording support mode is entered. When the start of recording is instructed under that mode, the state of the HD device 108 is detected at first, and the state of the VTR 110 is detected next. When there is no problem in either, the input video signal is recorded in both of the HD device 108 and the VTR 110. At this time, the video signal recorded in the HD device 108 is reproduced simultaneously with the recording upon request as mentioned above. Further, where there is an abnormality found in either device in the detection of state mentioned above, the abnormal state is displayed to the operation unit 300, and the input video signal is recorded in a normal device without abnormality. When there is an abnormality in both devices, this is displayed to the operation unit 300, and the recording processing is interrupted.

Further, where the video signal must be reliably reproduced without error, the reproduction of the video signal is carried out in the reproduction support mode.

By the click of the reproduction support instruction button 324 of the operation unit 300, the reproduction support mode is entered. If the recording support mode is in operation at this time, this mode is immediately released. Namely, the recording of the video signal which has been carried out in the VTR 110 is suspended.

When the HD device 108 is stopped, the reproduction position requested is detected. When the HD device 108 is reproducing a video signal, the reproduction position thereof is detected. The video tape mounted in the VTR 110 is brought to that position.

When the seek operation is ended, the time code of the video signal recorded at that position is detected and it is checked whether or not a video signal the same as the video signal reproduced by the HD device 108 is recorded. When the same video signal is recorded, synchronization is established based on the time code thereof and the reproduction of the same video signal is carried out simultaneously with the HD device 108.

After this, the state of the HD device 108 is monitored. When an abnormality occurs in the HD device 108, the third switch 112 is changed over so that the video signal reproduced at the VTR 110 is output.

In this way, in the video signal recording and reproducing apparatus 1 of the present embodiment, provision is made of both the HD device 108 capable of performing the random access and simultaneously performing recording and reproduction and the VTR 110 having a higher reliability and a host controller for managing and controlling the same together. Further, by utilizing such a configuration, the individual devices can be dynamically selected and used for recording the video signal to be input and for reproducing the requested video signal. Control with respect to these two devices can be carried out visually and easily under the GUI environment.

Accordingly, a video signal recording and reproducing apparatus capable of reliably recording an input video signal without fail and reliably outputting a video signal which must be reliably reproduced and output and having a very high reliability can be provided.

Further, when the video signal recorded in the HD device 108 is used, the reproduction can be almost simultaneously carried out with the recording and reproduction and editing in any format can be easily carried out. On the other hand, by using the VTR 110, the recorded data can be easily input to another video signal processing device, for example, an off-line editing machine, and a video signal recorded or edited by another device can be supplied to the present video signal recording and reproducing apparatus.

Further, the instructions of operation, processing, etc. can be centrally and easily carried out under a GUI environment. Namely, it is not necessary to give instructions separately to the HD device 108, VTR 110, etc. The instructions can be simply, visually, and intuitively carried out. Thus a video signal recording and reproducing apparatus having a better operability can be provided.

Note that, the present invention is not limited to the present embodiment and that various modifications are possible.

For example, the recording device for mainly recording the video signal was a hard magnetic disc device in the present embodiment, but the recording device is not limited to this. For example, it can be a magneto-optic disc (MO) device or large capacity memory constituted by a semiconductor memory. It can be any device so far as it is a randomly accessible recording device. Further, it is also possible to use an HDD array etc. using a plurality of hard disc devices.

Further, for the simultaneous recording/reproduction method in the recording device, a configuration in which the recording and reproduction can be simultaneously carried out with respect to one recording medium by using a plurality of heads was adopted in the present embodiment, but it is also possible to use a device having a configuration in which a plurality of recording media which can perform only recording or reproduction at one time are used and a plurality of signals predetermined time intervals apart can be simultaneously recorded or reproduced as a whole.

Further, the present embodiment was configured so that the control unit 200 detected the states of parts of the recording and reproducing unit 100 and generated commands to the parts based on the operation in the operation unit 300, but the division of the control between the control unit 200 and the control unit 118 of the recording and reproducing unit 100 and divisions of the control levels are not limited to such a format. Higher level control can be carried out in the control unit 118 of the recording and reproducing unit 100.

Figure 7:
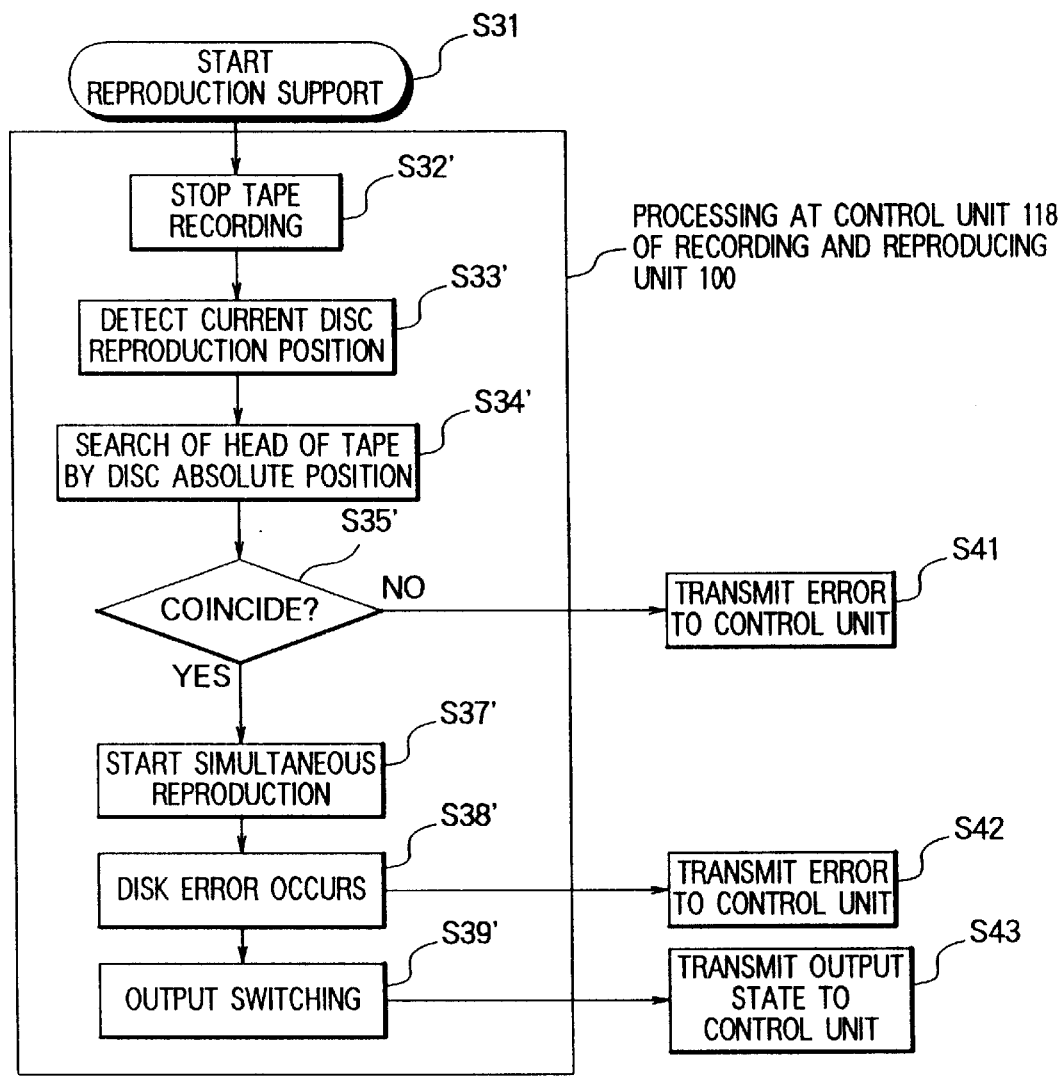
FIG. 7 is a view of a modification of the processing in the control unit of the recording and reproducing unit of the video signal recording and reproducing apparatus shown in FIG. 2.

For example, it is also possible to perform most of the processing in the control unit 200 of the reproduction support mode shown in FIG. 5 in the control unit 118 of the recording and reproducing unit 100 as shown in FIG. 7. In FIG. 7, the processings at steps S32, S33, S34, S35, S37, S38, and S39 in FIG. 5 are carried out as steps S32', S33', S34', S35', S37', S38', and S39' in the control unit 118 of the recording and reproducing unit 100. Only the transmission of information of error, the output state, etc. (steps S41, S42, and S43) to the control unit 200 is carried out by the control unit 118 of the recording and reproducing unit 100. When adopting such a control format, it is sufficient so far as only the command for starting the reproduction support (step S31) is carried out from the control unit 200 as the host controller with respect to the recording and reproducing unit 100. Fine control becomes unnecessary.

Accordingly, such a control format is more preferred where the control unit 200 and the operation unit 300 are constituted by a general use computer or the like and where the recording and reproducing unit 100 is controlled by a program or the like.

A more concrete example of the configuration of the video signal recording and reproducing apparatus of the present invention will be explained as an embodiment.

First, as the control unit 200 and the operation unit 300 of the embodiment mentioned above, FIG. 8 shows a video signal recording and reproducing apparatus in the case of use of a general purpose computer, for example, a personal computer.

Figure 8:
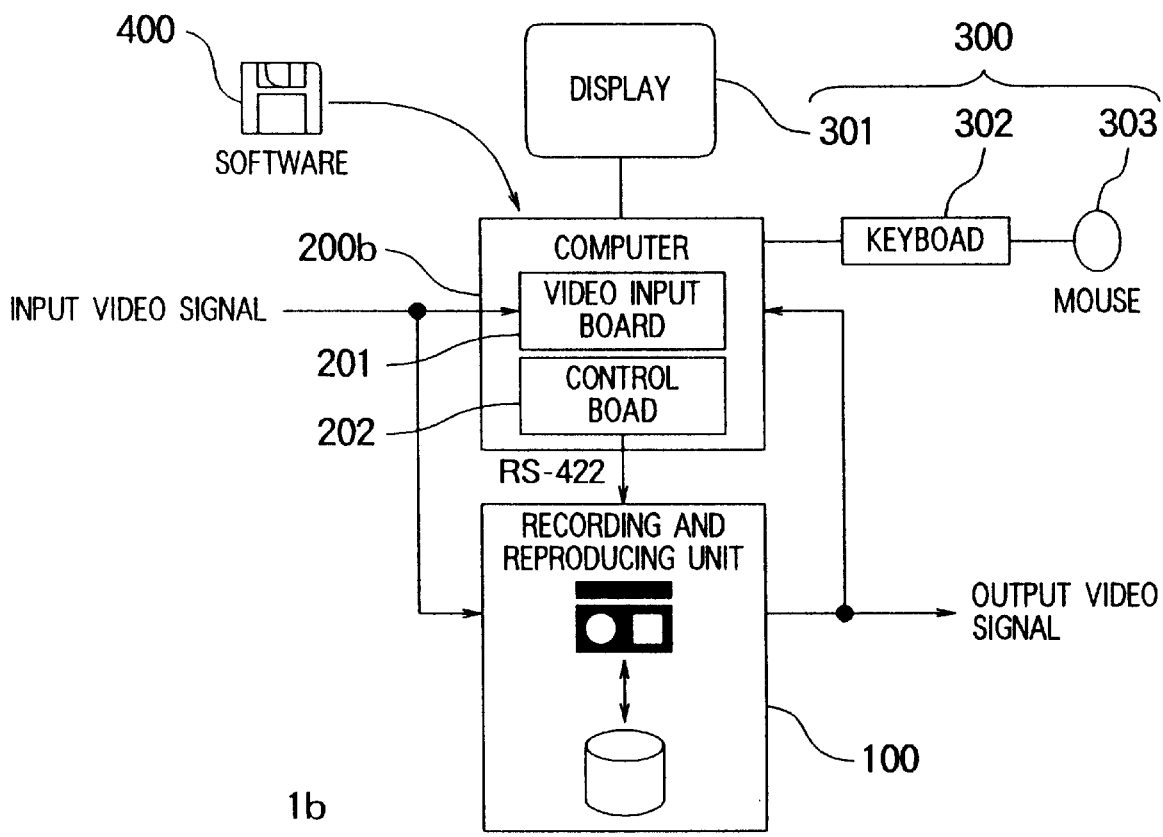
FIG. 8 is a view of a more concrete embodiment of the present invention and shows the configuration of a video signal recording and reproducing apparatus in the case where a personal computer is used as the control unit and operation unit of the video signal recording and reproducing apparatus shown in FIG. 2.

In a video signal recording and reproducing apparatus 1b shown in FIG. 8, first, a control board 202 for RS-422 communication control is inserted into an expansion slot of a personal computer 200b. The personal computer 200b and the recording and reproducing unit 100 are connected by this control board 202 and a RS-422 cable. With such a configuration, the control such as recording and reproduction is carried out between the personal computer 200b and the recording and reproducing unit 100 by a so-called VTR use nine-pin protocol.

Further, a video input board 201 is further inserted into the expansion slot of this personal computer 200b. The video signals to be input to the recording and reproducing unit 100 and the video signal to be output from the recording and reproducing unit 100 are fetched into the personal computer 200b via this video input board 201. The video signals are displayed as the input video and output video on the input video display 312 and the output video display 314 under the GUI environment displayed on the display 301 shown in FIG. 6.

Note that, in such a configuration, peripherals such as a display 301, keyboard 302, and mouse 303 usually provided in a personal computer constitute the operation unit 300 and are used for various operations.

By using such a general use personal computer as the control unit 200 and the operation unit 300, the control processing in the control unit 200 can be defined by software which can be freely installed via for example a floppy disc 400. Namely, by installing the control software performing the processing shown by the flowcharts of FIG. 4 and FIG. 5, the control processing shown in the embodiment mentioned above is executed. By installing software including such processing and performing the intended processing at a higher level, it is possible to provide the desired video signal recording and reproducing apparatus for the object and purpose.

Further, another embodiment will be described with reference to FIG. 9.

Figure 9:
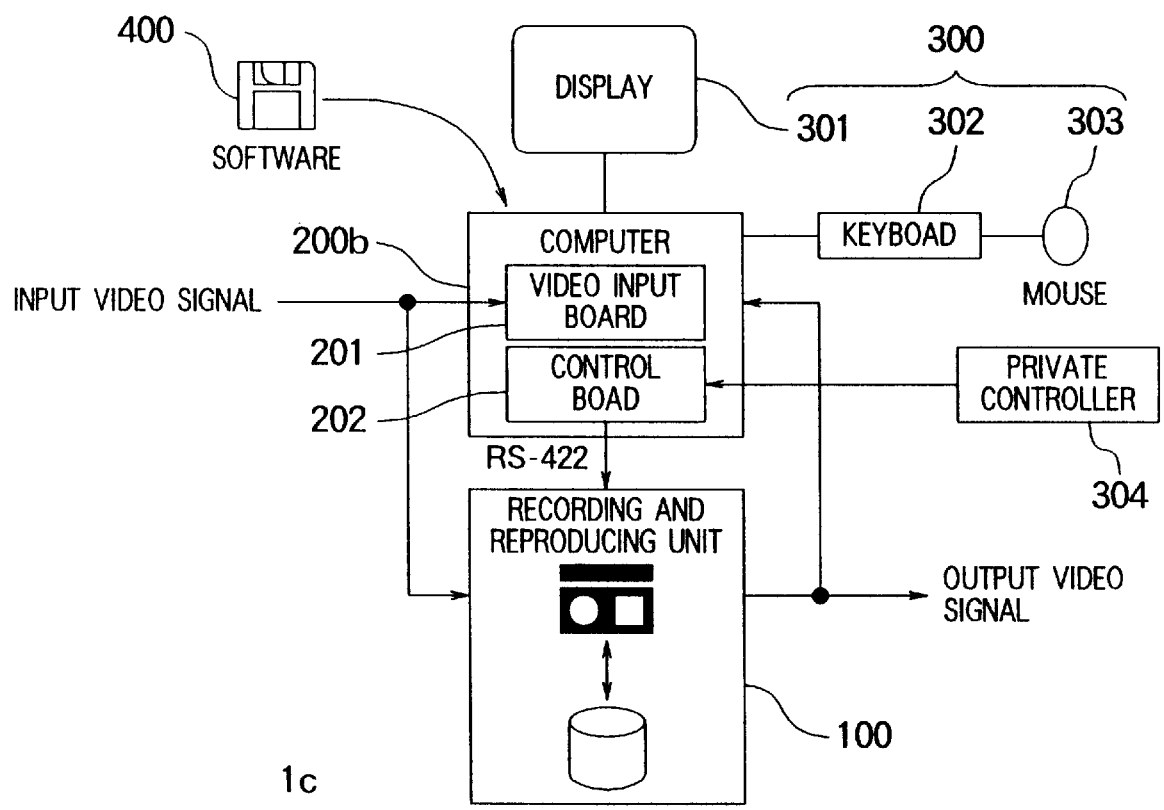
FIG. 9 is a view of a more concrete embodiment of the present invention and shows the configuration of a video signal recording and reproducing apparatus in the case where a private controller is further provided in the video signal recording and reproducing apparatus shown in FIG. 8.

A video signal recording and reproducing apparatus 1o shown in FIG. 9 is a video signal recording and reproducing apparatus using a personal computer as the control unit 200 and the operation unit 300 in the same way as FIG. 8, but is further separately provided with a controller 304 for the recording and reproducing unit 100 control.

This controller 304 is an operation device preferred for the editing etc. of jog shuttle, slow fade, and other video signals. Further, this controller 304 is connected to the personal computer 200b via the control board 202.

By providing such a private controller 304, a video signal recording and reproducing apparatus more excellent in man-machine interface can be provided.

According to the video signal recording and reproducing apparatus mentioned above, the video signals being input can be reliably recorded without failure of recording. Further, the recorded video signals can be reproduced and output at intended timings including the case where the reproduction is almost simultaneous with the recording. Further, these processings can be carried out by a centralized visual operation using GUI. Further, the recording of the video data can be carried out also on the VTR tape, therefore nonlinear editing etc. using that VTR tape can be separately carried out, and thus video signals which are input in a wide application range can be processed. Namely, a video signal recording and reproducing apparatus capable of performing recording and reproduction of video signals at an intended timing and in an intended format with a high reliability and good operability and further capable of being applied to other apparatuses and forms of utilization and having a high applicability and convenience can be provided.

While the invention has been described by reference to specific embodiments chosen for purposes of illustration, it should be apparent that numerous modifications could be made thereto by those skilled in the art without departing from the basic concept and scope of the invention.

What is claimed is:

1. A video signal recording and reproducing apparatus for performing the recording and reproduction of video signals, comprising:

a first recording and reproducing means for recording the input video signals and for reproducing the recorded video signals at any time including almost simultaneously with the recording and upon request after this time;

a second recording and reproducing means for recording the video signals to be recorded in said first recording and reproducing means simultaneously with the first recording and reproducing means upon request;

a selecting means for selecting the video signal reproduced in either of said first recording and reproducing means or said second recording and reproducing means; and a controlling means for controlling the recording of the input video signals to said second recording and reproducing means and the selection of the video signals in said selecting means, wherein selection of video signal reproduction by said second recording and reproducing means can be effected at any time during simultaneous recording of the video signal by said first and second recording and reproducing means such that selection of reproduction by said second recording and reproducing means is independent of the duration of the video signal being recorded.

2. The video signal recording and reproducing apparatus as set forth in claim 1, wherein said controlling means performs said control so that said second recording and reproducing means records the input video signals when at least the recording state of said video signals in said first recording and reproducing means is not adequate.

3. The video signal recording and reproducing apparatus as set forth in claim 2, wherein said controlling means performs said control so that said selecting means selects the video signal to be reproduced by said second recording and reproducing means when at least the state of reproduction of said video signals in said first recording and reproducing means is not adequate.

4. The video signal recording and reproducing apparatus as set forth in claim 3, further comprising a time code generating means for generating a predetermined time code with respect to at least said input video signal;

said first recording and reproducing means and said second recording and reproducing means synchronously reproducing video signals based on the time code.

5. The video signal recording and reproducing apparatus as set forth in claim 4, wherein said controlling means has:

a first controlling means for directly controlling at least said first recording and reproducing means, said second recording and reproducing means, and said selecting means and operating the means in synchronization and a second controlling means for receiving as its inputs instructions of workers and instructing predetermined control procedures with respect to said first controlling means based on the input instruction.

6. The video signal recording and reproducing apparatus as set forth in claim 5, wherein said second controlling means has a configuration capable of performing instructions based on a graphical user interface (GUI) on any display device; and at least the recording of said input video signals to said second recording and reproducing means and said instructions of workers concerning the selection of the video signals in said selecting means are carried out by this.

7. The video signal recording and reproducing apparatus as set forth in claim 6, wherein said first recording and reproducing means is a means for recording said video signals on a randomly accessible disc-like recording medium.

8. The video signal recording and reproducing apparatus as set forth in claim 7, wherein said second recording and reproducing means comprises a means for recording said video signals on a tape-like recording medium.

9. The video signal recording and reproducing apparatus as set forth in claim 8, further comprising a coding means for coding the input video signals by a predetermined coding system;

said first recording and reproducing means and said second recording and reproducing means recording the coded video signals.

10. The video signal recording and reproducing apparatus as set forth in claim 9, further comprising a decoding means for decoding coded video signals to be reproduced by said first recording and reproducing means and said second recording and reproducing means;

the decoded video signals being output.

11. The video signal recording and reproducing apparatus as set forth in claim 10, further comprising a transferring means for transferring the coded video signals recorded in said second recording and reproducing means directly to said first recording and reproducing means.

12. The video signal recording and reproducing apparatus as set forth in claim 11, wherein said second controlling means comprises a general purpose computer.

* * * * *